(12) United States Patent
Kato et al.

(10) Patent No.: US 7,929,404 B2
(45) Date of Patent: Apr. 19, 2011

(54) INFORMATION RECORDING MEDIUM, INFORMATION RECORDING APPARATUS, AND COMPUTER PROGRAM

(75) Inventors: Masahiro Kato, Tokorozawa (JP); Toshio Suzuki, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 1140 days.

(21) Appl. No.: 11/631,425

(22) PCT Filed: Jun. 30, 2005

(86) PCT No.: PCT/JP2005/012047
§ 371 (c)(1),
(2), (4) Date: Jan. 3, 2007

(87) PCT Pub. No.: WO2006/003978
PCT Pub. Date: Jan. 12, 2006

(65) Prior Publication Data
US 2008/0043609 A1 Feb. 21, 2008

(30) Foreign Application Priority Data

Jul. 5, 2004 (JP) .................................. 2004-198526

(51) Int. Cl.
*G11B 7/26* (2006.01)
*G11B 3/70* (2006.01)

(52) U.S. Cl. ............. 369/275.4; 369/275.1; 369/275.2; 369/275.3; 369/124.08; 369/94; 369/59.25

(58) Field of Classification Search .... 369/275.1–275.4, 369/283, 124.08, 275.5, 128
See application file for complete search history.

(56) References Cited

U.S. PATENT DOCUMENTS

| 6,996,053 B2 * | 2/2006 | Nakamura et al. ......... 369/275.3 |
| 2002/0136125 A1 * | 9/2002 | Kojima et al. ............. 369/47.54 |
| 2005/0041546 A1 * | 2/2005 | Suzuki ...................... 369/47.27 |

FOREIGN PATENT DOCUMENTS

| JP | 03-219440 | 9/1991 |
| JP | 08-147762 | 6/1996 |
| JP | 2000-311346 | 11/2000 |
| JP | 2001-023237 | 1/2001 |
| JP | 2002-050053 | 2/2002 |
| JP | 2002-074679 | 3/2002 |
| WO | 2004/055790 | 7/2004 |

OTHER PUBLICATIONS 80 mm (1.23GB/layer) and 120 mm (3.95 GB/layer) DVD Recordable Disc (DVD-R), JIS standard X6245, JSA (Japanese Standards Association), 1999, pp. 40-54.

* cited by examiner

*Primary Examiner* — Joseph Haley
*Assistant Examiner* — Andrew J Sasinowski
(74) *Attorney, Agent, or Firm* — Young & Thompson

(57) ABSTRACT

An information recording medium (100) is provided with a plurality of recording layers (L0 layer, L1 layer) to record therein record information, and property information (200) indicating properties of the each recording layer is recorded in each of the plurality of recording layers.

9 Claims, 11 Drawing Sheets

| Frame No | Bit position | | | |
|---|---|---|---|---|
| | 0 | 1 to 4 | 5(MSB) to 12(LSB) | |
| 0 | | 0000 | ECC block address (1st byte) | |
| 1 | | 0001 | ECC block address (2nd byte) | |
| 2 | | 0010 | ECC block address (3rd byte) | Part A |
| 3 | | 0011 | Parity A (1st byte) | |
| 4 | | 0100 | Parity A (2nd byte) | |
| 5 | | 0101 | Parity A (3rd byte) | |
| 6 | | 0110 | Field ID | |
| 7 | Sync bit | 0111 | ECC block address (1st byte) | |
| 8 | | 1000 | ECC block address (2nd byte) | |
| 9 | | 1001 | ECC block address (3rd byte) | |
| 10 | | 1010 | Layer information | |
| 11 | | 1011 | Reserved area | Part B |
| 12 | | 1100 | Reserved area | |
| 13 | | 1101 | Parity B (1st byte) | |
| 14 | | 1110 | Parity B (2nd byte) | |
| 15 | | 1111 | Parity B (3rd byte) | |

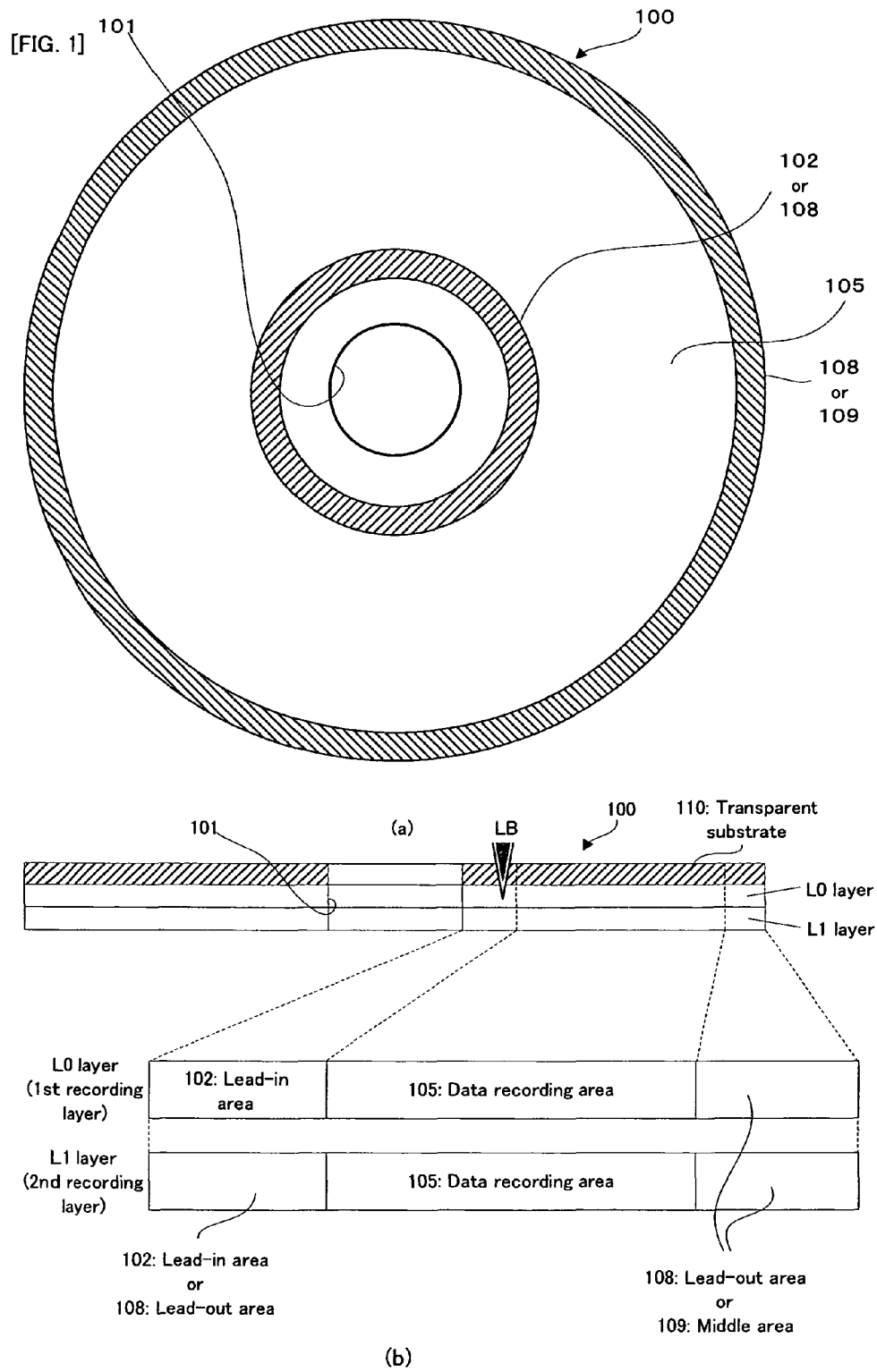

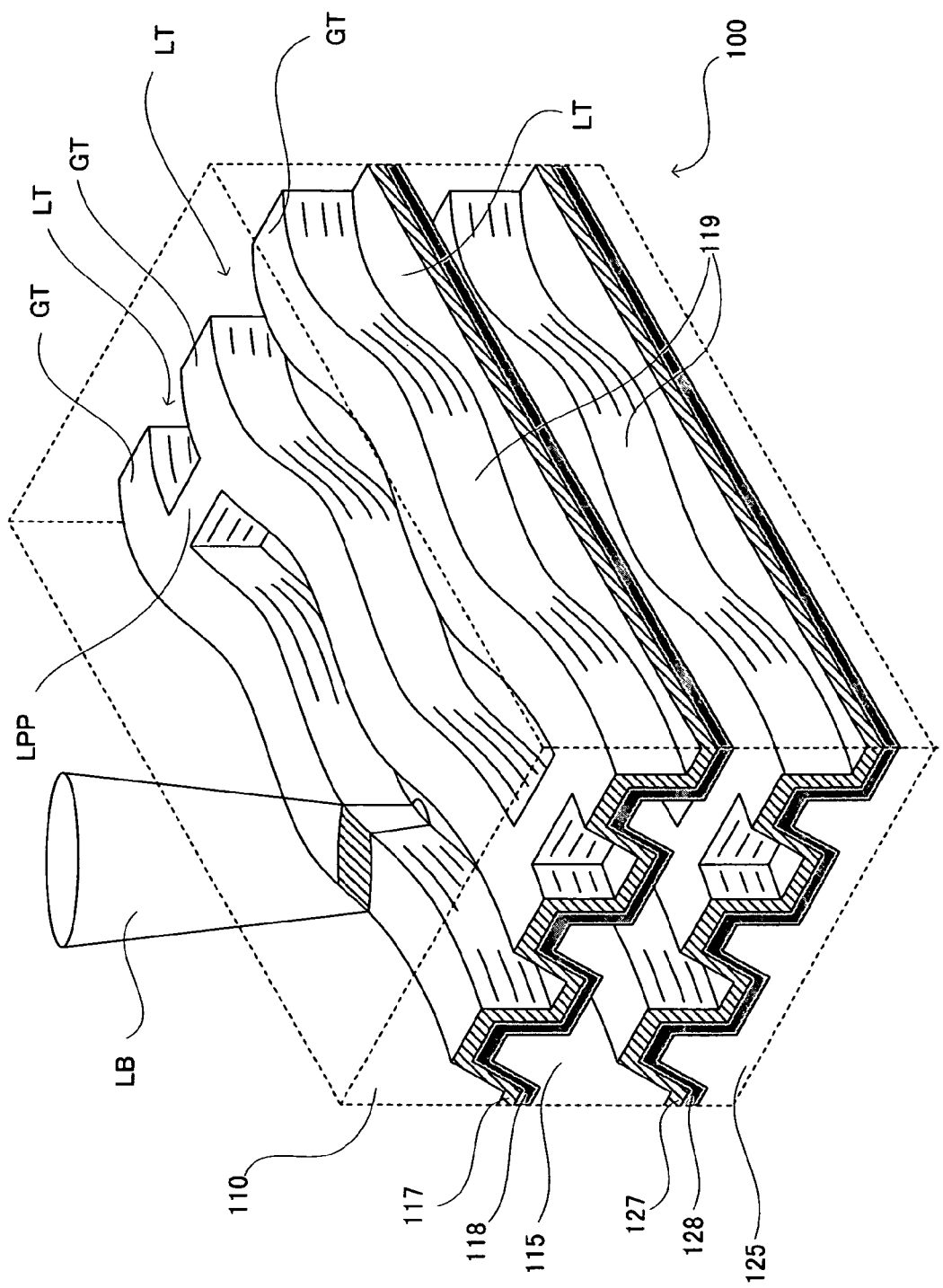
[FIG. 2]

[FIG. 3]
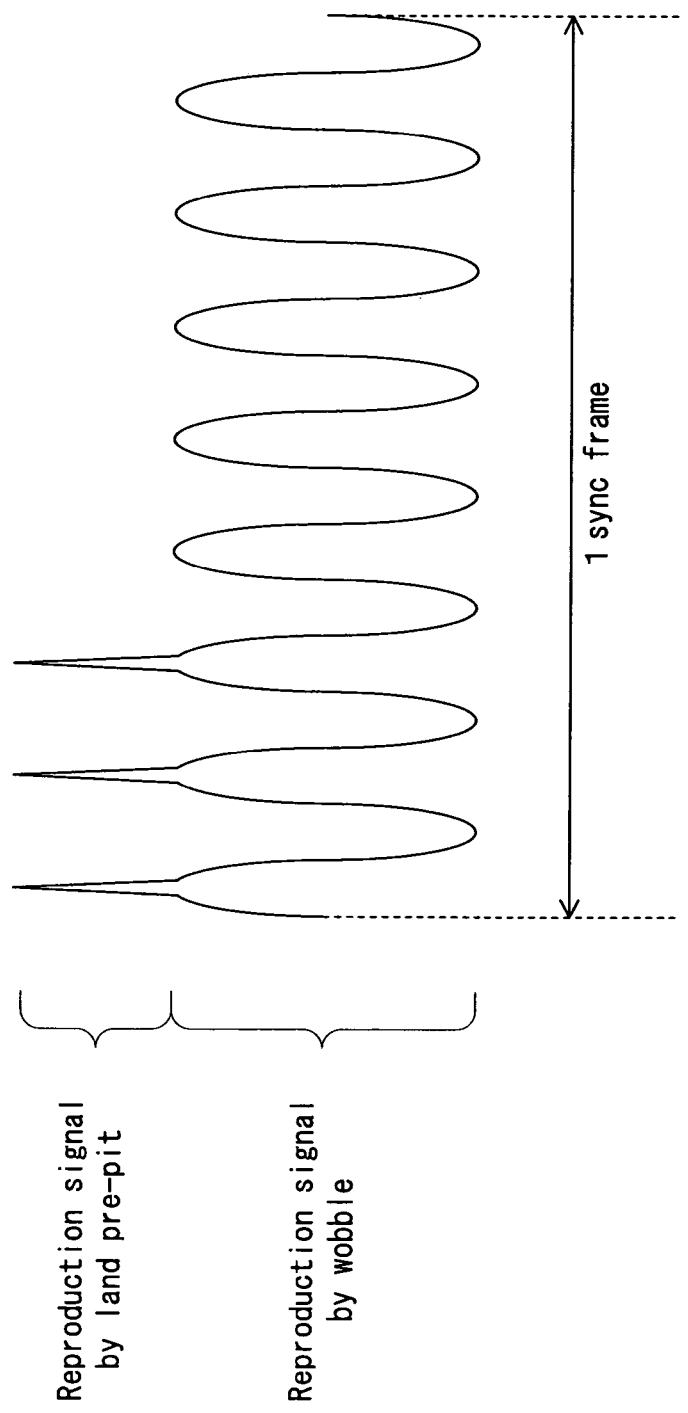

[FIG. 4]
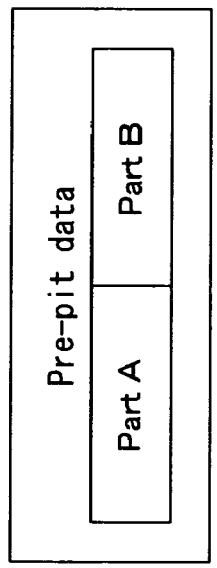
(a)
| Field ID | Data content (part B) | | Location |
|---|---|---|---|
| ID_0 | ECC block address | Layer information (200) | Entire area |
| ID_1 | Application code | | Lead-in area/ Lead-out area |
| ID_2 | Reserved area | | Lead-in area/ Lead-out area |
| ID_3 | 1st manufacturer code | | Lead-in area/ Lead-out area |
| ID_4 | 2nd manufacturer code | | Lead-in area/ Lead-out area |
| ID_5 | Reserved area | | Lead-in area/ Lead-out area |
(b)

[FIG. 5]

| Frame No | Bit position | | | |
|---|---|---|---|---|
| | 0 | 1 to 4 | 5(MSB) to 12(LSB) | |
| 0 | Sync bit | 0000 | ECC block address (1st byte) | Part A |
| 1 | | 0001 | ECC block address (2nd byte) | |
| 2 | | 0010 | ECC block address (3rd byte) | |
| 3 | | 0011 | Parity A (1st byte) | |
| 4 | | 0100 | Parity A (2nd byte) | |
| 5 | | 0101 | Parity A (3rd byte) | |
| 6 | | 0110 | Field ID | |
| 7 | | 0111 | ECC block address (1st byte) | Part B |
| 8 | | 1000 | ECC block address (2nd byte) | |
| 9 | | 1001 | ECC block address (3rd byte) | |
| 10 | | 1010 | Layer information | |
| 11 | | 1011 | Reserved area | |
| 12 | | 1100 | Reserved area | |
| 13 | | 1101 | Parity B (1st byte) | |
| 14 | | 1110 | Parity B (2nd byte) | |
| 15 | | 1111 | Parity B (3rd byte) | |

| Bit content | Bit position | Bit configuration |
|---|---|---|
| Layer flag | 5 | 0b: L0 layer  1b: L1 layer |
| Reserved area | 6 to 12 | Reserved |

[FIG. 7]

| Bit content | Bit position | Bit configuration |
|---|---|---|
| Layer flag | 5 | 0b: L0 layer　1b: other |
| Media flag | 6 | 0b: recording type　1b: reserved |
| Layer number flag | 7 to 8 | 00b: L0 layer　01b: L1 layer　others: reserved |
| Reserved area | 9 | Reserved |
| Track direction flag | 10 | 0b: inner→outer　1b: outer→inner |
| Reserved area | 11 | Reserved |
| Addressing flag | 12 | 0b: decrement　1b: increment |

[FIG. 8]
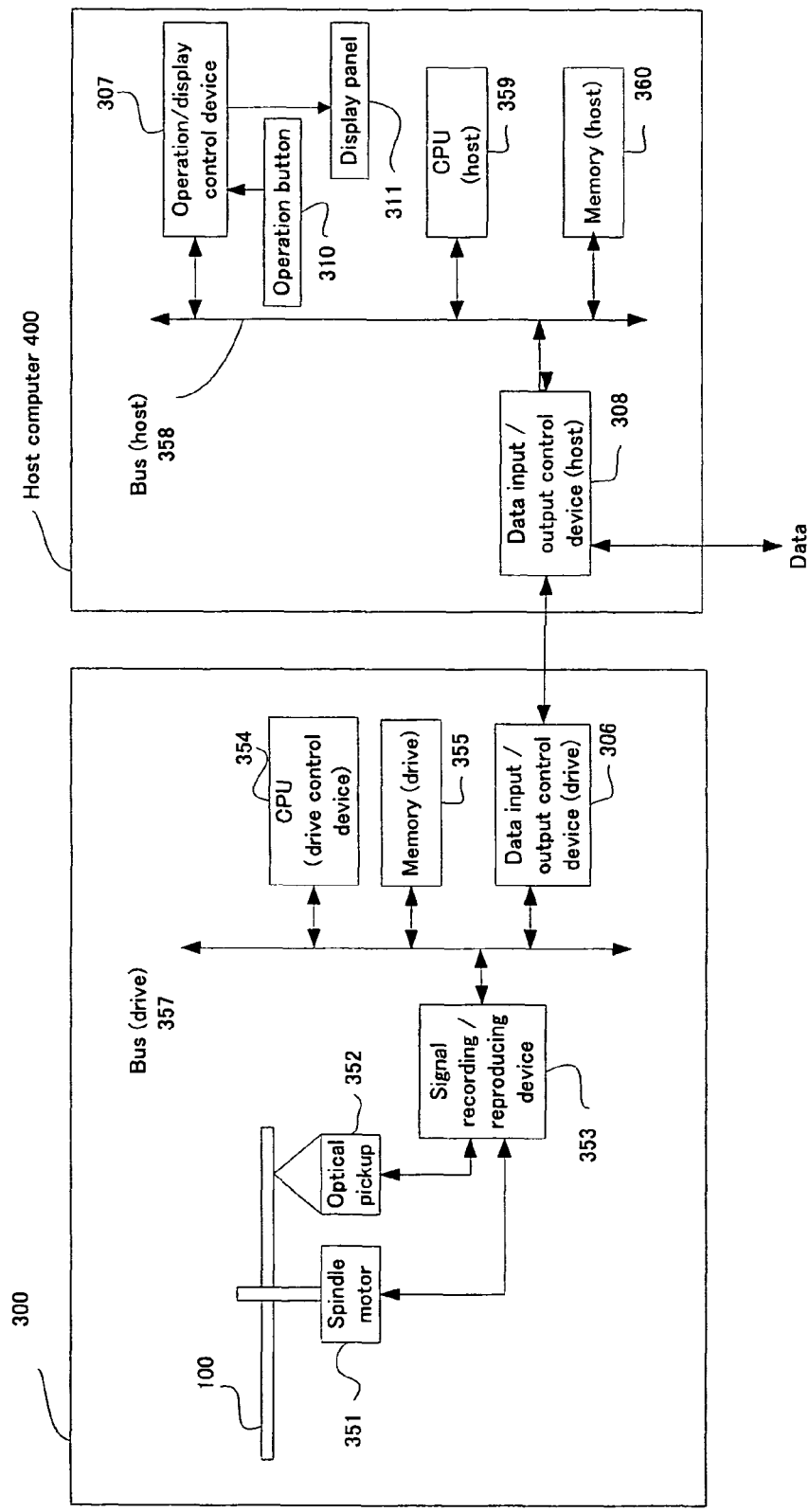

[FIG. 9]
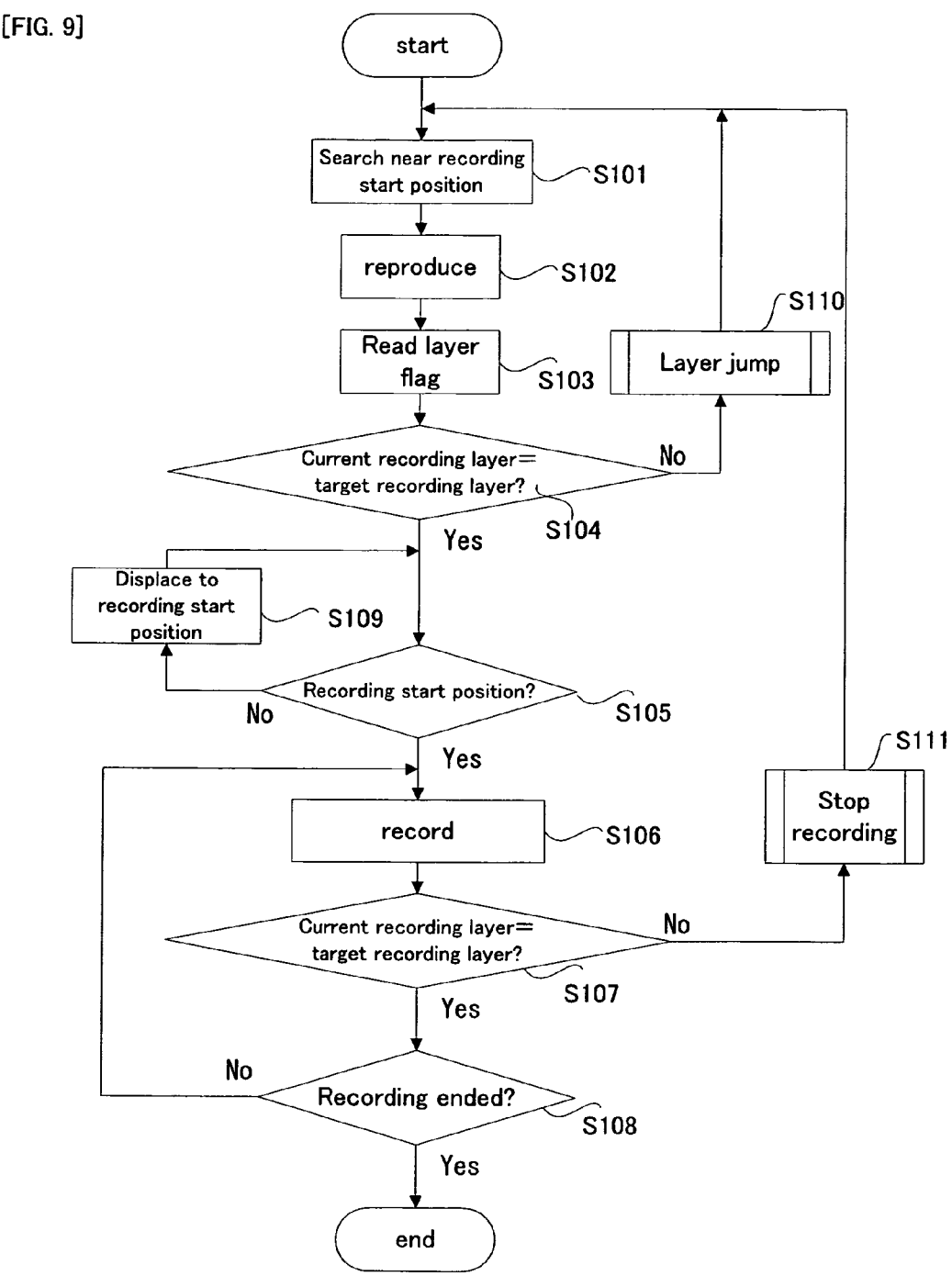

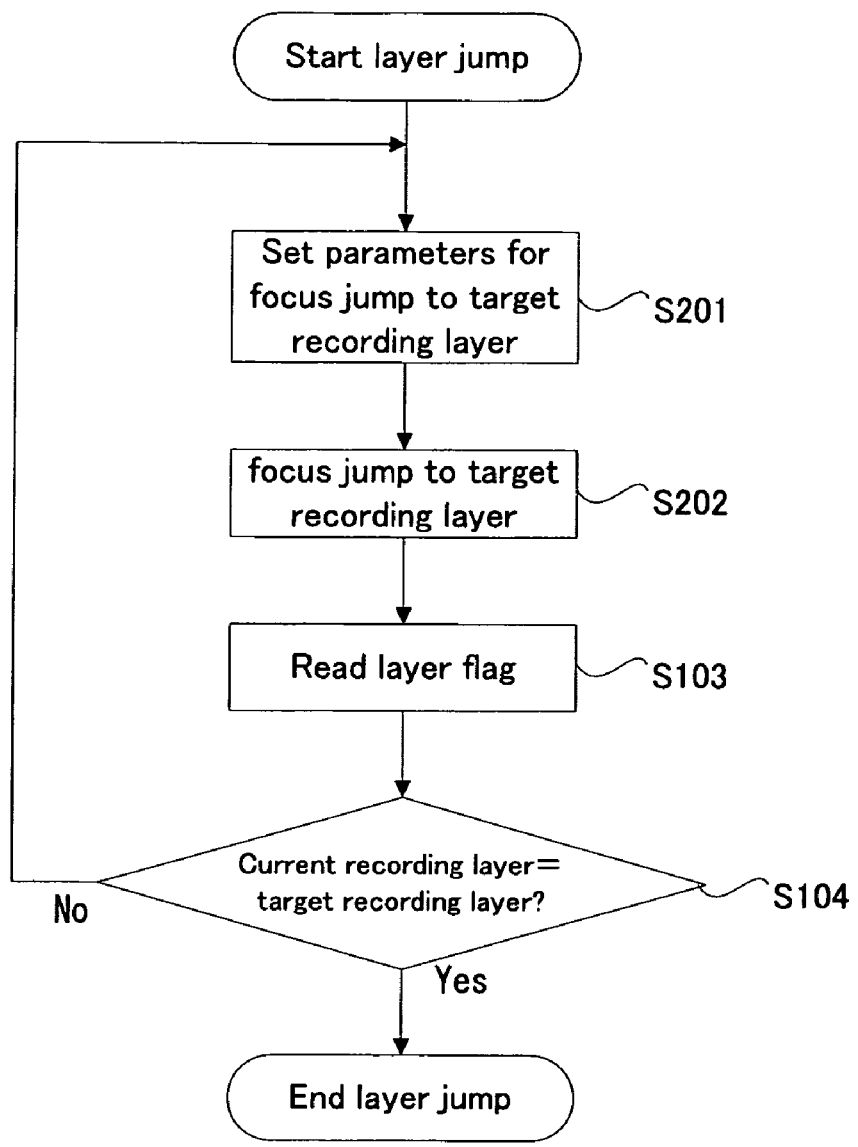
[FIG. 10]

[FIG. 11]
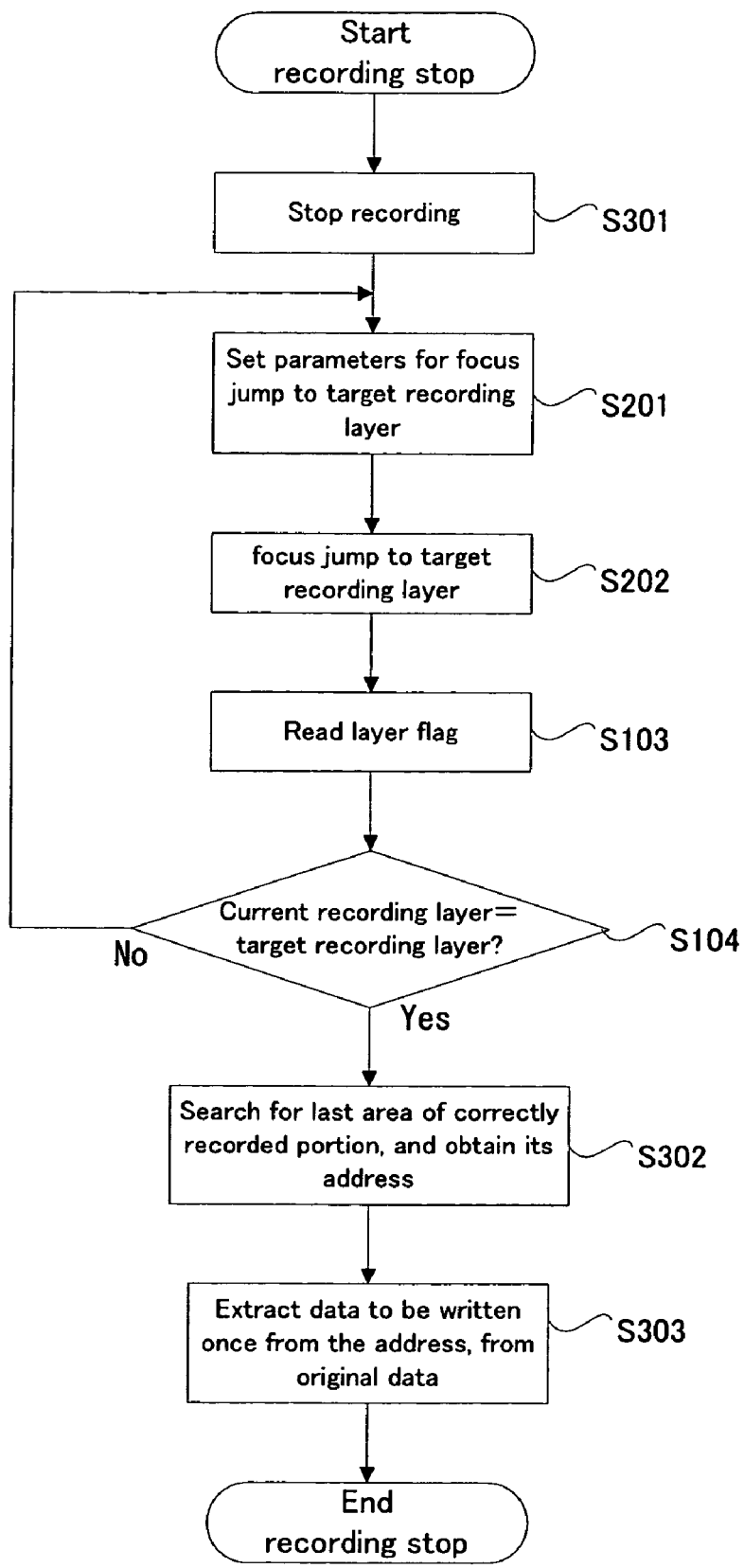

INFORMATION RECORDING MEDIUM, INFORMATION RECORDING APPARATUS, AND COMPUTER PROGRAM

TECHNICAL FIELD

The present invention relates to an information recording medium, such as a DVD, an information recording apparatus, such as a DVD recorder, an information recording method, and a computer program which makes a computer function as the information recording apparatus.

BACKGROUND ART

For example, with regard to an information recording medium, such as an optical disc, like a CD-ROM (Compact Disc-Read Only Memory), a CD-R (Compact Disc-Recordable), and a DVD (Digital Versatile Disk)-ROM, there has been also developed an optical disc of a multilayer type or double layer type or multiple layer type in which a plurality of recording layers are laminated on the same substrate, as described in patent documents 1 and 2 or the like. More specifically, a dual-layer type optical disc, i.e. a two-layer type optical disc, has a first recording layer which is on the nearest side viewed from the irradiation side of laser light in recording by using an information recording apparatus (i.e. on the closest side to an optical pickup), as a first layer (wherein the first recording layer is referred to as a "L0 layer", as occasion demands, in this application). Moreover, it has a semi-transparent reflective film located on the rear side of the first recording layer (i.e. on the farther side from the optical pickup). The dual-layer type optical disc has a second recording layer which is located on the rear side of the semi-transparent reflective film via a middle layer, such as an adhesion layer, as a second layer (wherein the second recording layer is referred to as a "L1 layer", as occasion demands, in this application). Moreover, it has a reflective film located on the rear side of the second recording layer. Then, in the information recording apparatus, such as a CD recorder, for recording information onto such a dual-layer type optical disc, the information is recorded into the L0 layer in a rewritable method or irreversible change recording method by heat or the like, by focusing the laser light for recording onto the L0 layer, and the information is recorded into the L1 layer in a rewritable method or irreversible change recording method by heat or the like, by focusing the laser light onto the L1 layer.
Patent document 1: Japanese Patent Application Laying Open NO. 2000-311346
Patent document 2: Japanese Patent Application Laying Open NO. 2001-23237

DISCLOSURE OF INVENTION

Subject to be Solved by the Invention

However, out of such a multilayer type optical disc, a recordable type optical disc, such as a DVD-R, for example, is still at the development stage and has not come into practical use, as of July, 2004. In a single layer type DVD-R which has been practically used, information indicating that the disc has a single layer structure is recorded in a lead-in area. In the multilayer type optical disc, even if information or the like indicating that the disc is of a multilayer type is recorded in the lead-in area, for example, if the laser light is focused on a recording layer different from the recording layer that is originally a recording target when a recording operation is performed, there is such a technical problem that laser light being focused on a recording layer different from the recording layer that is originally a recording target cannot be recognized on the information recording/reproducing apparatus side, so that the proper recording operation cannot be performed.

In order to solve the above-mentioned conventional problem, it is therefore an object of the present invention to provide an information recording medium and an information recording apparatus, which can perform proper data recording and reproduction or the like on the information recording medium of a multilayer type, for example, and a computer program which makes a computer function as such an information recording apparatus.

Means for Solving the Object

Information Recording Apparatus

The above object of the present invention can be achieved by an information recording medium provided with a plurality of recording layers to record therein record information, property information being recorded in each of the plurality of recording layers, the property information indicating properties of the each recording layer.

According to the information recording medium of the present invention, it has two, three or more recording layers, for example, and it is possible to record the record information into each recording layer.

Particularly in the present invention, the property information is recorded in each recording layer, wherein the property information indicates the properties (or the condition, characteristics, features or the like of each recording layer, and specifically, an identification number of the recording layer, a type of recording of the recording layer, a track processing direction, a recording aspect of address information, or the like, described later) of each recording layer. For example, if the information recording medium has one recording layer and another recording layer, the property information indicating the properties of the one recording layer is recorded in the one recording layer, and the property information indicating the properties of the other recording layer is recorded in the other recording layer. Even in the case of the three or more recording layers, the property information is recorded in the same aspect.

Therefore, when an information recording apparatus described later records the record information into one recording layer, it is possible to relatively easily refer to the property information recorded in the one recording layer (i.e. the property information indicating the properties of the one recording layer) in parallel with the recording operation. Moreover, it is possible to adjust the aspect of the recording operation, as occasion demands, so as to record the record information into the one recording layer in a more preferable aspect, with reference to the property information.

Consequently, according to the information recording medium in the present invention, since the property information indicating the properties of each recording layer is recorded in each of the plurality of recording layers, it is possible to realize the more preferable recording operation, on the basis of the property information.

Incidentally, in the information recording medium of the present invention, at least one portion of the recoding area owned by the plurality of recording layers is preferably a record type (i.e. not a read-only type).

In another aspect of the information recording medium of the present invention, each of the plurality of recording layers is provided with a data recording area to record therein the record information, and the property information is recorded to be distributed in the entire data recording area in the each recording layer.

According to this aspect, in the recording operation of recording the record information into the data area, performed by the operation of the information recording apparatus described later, it is possible to obtain the property information in real time, in parallel with the recording operation. Namely, it is unnecessary to bother to access the particular recording area on the information recording medium, like a lead-in area or the like, for example, to thereby obtain the property information. Therefore, it is possible to obtain the property information, more quickly (or immediately or instantly), to thereby perform the preferable recording operation on the multilayer type information recording medium.

In another aspect of the information recording medium of the present invention, the property information is recorded to be distributed in the entire each recording layer.

According to this aspect, in the recording operation of the information recording apparatus described later, it is possible to obtain the property information in real time, in parallel with the recording operation. Namely, it is unnecessary to bother to access the particular recording area on the information recording medium, like a lead-in area or the like, for example, to thereby obtain the property information. Therefore, it is possible to obtain the property information, more quickly (or immediately or instantly), to thereby perform the preferable recording operation on the multilayer type information recording medium.

In another aspect of the information recording medium of the present invention, the property information is recorded in at least one portion of the each recording layer.

According to this aspect, in the recording operation of the information recording apparatus described later, it is possible to obtain the property information in real time, in parallel with the recording operation, and yet it is possible to reduce a recording capacity required for the recording of the property information. Therefore, it is possible to perform the preferable recording operation on the multilayer type information recording medium.

In another aspect of the information recording medium of the present invention, a plurality of property information is repeatedly recorded.

According to this aspect, in the recording operation of the information recording apparatus described later, it is possible to obtain the property information in real time, in parallel with the recording operation. Namely, it is unnecessary to bother to access the particular recording area on the information recording medium, like a lead-in area or the like, for example, to thereby obtain the property information. Therefore, it is possible to obtain the property information, more quickly (or immediately or instantly), to thereby perform the preferable recording operation on the multilayer type information recording medium.

In another aspect of the information recording medium of the present invention, the property information indicates the properties of a recording area portion in which the property information is recorded.

According to this aspect, the property information is recorded which indicates the properties of each recording area portion corresponding to one portion of the recording layer of the information recording medium. Therefore, in recording the record information into a predetermined recording area portion, it is possible to obtain the property information indicating the properties of the recording area portion, in parallel with the recording operation. As a result, it is possible to obtain the property information, quickly (or immediately or instantly).

In another aspect of the information recording medium of the present invention, the property information indicates the properties of a recording area portion in which the property information is recorded and vicinity of the recording area portion.

According to this aspect, in recording the record information into the predetermined recording area portion, it is possible to obtain the property information indicating the properties of the recording area portion, in parallel with the recording operation. As a result, it is possible to obtain the property information, quickly (or immediately or instantly).

In another aspect of the information recording medium of the present invention, the property information includes a layer identification flag (e.g. a layer flag and a layer number flag, described later) for identifying the each recording layer.

According to this aspect, on the basis of the layer identification flag, it is possible to identify each of the plurality of recording layers. Therefore, even if laser light is mistakenly focused on an unexpected recording layer or in similar cases, it is possible to recognize that the focusing is performed on the incorrect recording layer, relatively easily and quickly (or immediately or instantly).

In another aspect of the information recording medium of the present invention, the property information includes a type flag indicating a type of recording of the each recording layer.

According to this aspect, on the basis of the type flag, it is possible to recognize the type of recording (e.g. a rewritable type, an additional recording type (write-once type), a read-only type, etc.) in each recording layer (or the recording area portion corresponding to one portion of each recording layer), relatively easily and quickly (or immediately or instantly).

In another aspect of the information recording medium of the present invention, the property information includes a track direction flag indicating a record track traveling direction in the each recording layer.

According to this aspect, on the basis of the track direction flag, it is possible to recognize the track traveling direction in each recording layer (or the recording area portion corresponding to one portion of each recording layer), relatively easily and quickly (or immediately or instantly).

In another aspect of the information recording medium of the present invention, the property information includes an address flag (e.g. an addressing flag described later or the like) indicating a recording aspect of address information in the each recording layer.

According to this aspect, on the basis of the address flag, it is possible to recognize the recording aspect of the address information in each recording layer (or the recording area portion corresponding to one portion of each recording layer), relatively easily and quickly (or immediately or instantly).

In another aspect of the information recording medium of the present invention, the property information is recorded by a pre-pit (e.g. a land pre-pit described later) formed on a recording track of the information recording medium.

According to this aspect, it is possible to properly record the property information onto an information recording medium of DVD-R/RW or the like, for example.

In another aspect of the information recording medium of the present invention, the property information is recorded by a modulation signal applied to a recording track of the information recording medium which wobbles in a predetermined cycle.

According to this aspect, it is possible to properly record the property information onto an information recording medium of DVD+R/RW or the like, for example.

(Information Recording Apparatus)

The above object of the present invention can be also achieved by an information recording apparatus for recording the record information onto the above-mentioned information recording medium of the present invention (including its various aspects), the information recording apparatus provided with: an obtaining device for obtaining the property information; and a recording device for recording the record information on the basis of the obtained property information.

According to the information recording apparatus of the present invention, while obtaining the property information by the operation of the obtaining device, it is possible to record the record information onto the information recording medium by the operation of the recording device. In particular, on the basis of the property information obtained by the obtaining device, the recording operation of recording the record information in the more preferable aspect is performed. Therefore, it is possible to receive the same various benefits as those owned by the above-mentioned information recording medium of the present invention.

Incidentally, in response to various aspects of the information recording medium of the present invention described above, the information recording apparatus of the present invention can also adopt various aspects.

In one aspect of the information recording apparatus of the present invention, the property information includes a layer identification flag indicating an identification number of the each recording layer, the obtaining device obtains the layer identification flag, and the recording device records the record information into a desired recording layer from among the plurality of recording layers, on the basis of the obtained layer identification flag.

According to this aspect, on the basis of the layer identification flag, it is possible to identify each of the plurality of recording layers. Therefore, even if laser light is mistakenly focused on an unexpected recording layer or in similar cases, it is possible to recognize that focusing is performed on the incorrect recording layer, relatively easily and quickly (or immediately or instantly). Alternatively, it is possible to properly focus on the recording layer on which the laser light is originally to be focused, from the start of the recording operation. By this, it is also possible to preferably record the record information into the desired recording layer, even in the case of the information recording medium having the plurality of recording layers.

(Information Recording Method)

The above object of the present invention can be also achieved by an information recording method of recording the record information onto the above-mentioned information recording medium of the present invention (including its various aspects), the information recording method provided with: an obtaining process of obtaining the property information; and a recording process of recording the record information on the basis of the obtained property information.

According to the information recording method of the present invention, it is possible to receive the same various benefits as those of the above-mentioned information recording apparatus of the present invention.

Incidentally, in response to various aspects of the information recording apparatus of the present invention described above, the information recording method of the present invention can also adopt various aspects.

In one aspect of the information recording method of the present invention, the property information includes a layer identification flag indicating an identification number of the each recording layer, the obtaining process obtains the layer identification flag, and the recording process records the record information into a desired recording layer from among the plurality of recording layers, on the basis of the obtained layer identification flag.

According to this aspect, on the basis of the layer identification flag, it is possible to identify each of the plurality of recording layers. Therefore, even if laser light is mistakenly focused on an unexpected recording layer or in similar cases, it is possible to recognize that focusing is performed on the incorrect recording layer, relatively easily and quickly (or immediately or instantly). Alternatively, it is possible to properly focus on the recording layer on which the laser light is originally to be focused, from the start of the recording operation. By this, it is also possible to preferably record the record information into the desired recording layer, even in the case of the information recording medium having the plurality of recording layers.

(Computer Program)

The above object of the present invention can be also achieved by computer program for recording control to control a computer provided in the above-mentioned information recording apparatus of the present invention (including its various aspects), to make the computer function as at least one portion of the obtaining device and the recording device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned information recording apparatus of the present invention, the computer program of the present invention can adopt various aspects.

These effects and other advantages of the present invention will become more apparent from the following embodiment.

As explained above, according to the information recording medium, the property information is recorded in each recording layer. Therefore, it is possible to realize the more preferable recording operation on the basis of the property information.

As explained above, according to the information recording apparatus, it is provided with the obtaining device and the recording device. Therefore, it is possible to preferably record the record information onto the information recording medium, with reference to the property information.

BRIEF DESCRIPTION OF DRAWINGS

FIG. 1 are a substantial plan view showing the basic structure of an optical disc having a plurality of recording areas in an embodiment of the information recording medium of the present invention, and a schematic cross sectional view of the optical disc and a corresponding conceptual diagram showing a recording area structure in the radial direction.

FIG. 2 is a partially enlarged perspective view showing the recording surface of the optical disc in the embodiment.

FIG. 3 is an explanatory diagram showing a reproduction signal in reproducing wobble and LPP formed on the optical disc in the embodiment.

FIG. 4 are explanatory diagrams showing the data structure and the data content of pre-pit data recorded on the optical disc in the embodiment.

FIG. 5 is an explanatory diagram showing the more detailed data structure of the pre-pit data recorded on the optical disc in the embodiment.

FIG. 6 is an explanatory diagram showing the more detailed data structure and data content of layer information included in the pre-pit data in the embodiment.

FIG. 7 is an explanatory diagram showing the more detailed data structure and data content of the layer information included in the pre-pit data in a modified example.

FIG. 8 is a block diagram showing an information recording/reproducing apparatus as an embodiment of the information recording apparatus of the present invention, and a host computer.

FIG. 9 is a flowchart conceptually showing a flow of the entire recording operation of the information recording/reproducing apparatus in the embodiment.

FIG. 10 is a flowchart conceptually showing a flow of the layer jump operation of the information recording/reproducing apparatus in the embodiment.

FIG. 11 is a flowchart conceptually showing a flow of the recording stop operation of the information recording/reproducing apparatus in the embodiment.

DESCRIPTION OF REFERENCE CODES 100 optical disc
200 layer information
210 layer flag
220 media flag
230 layer number flag
240 track direction flag
250 addressing flag
300 information recording/reproducing apparatus
352 optical pickup
353 signal recording/reproducing device
354 CPU
L0 layer first recording layer
L1 layer second recording layer
LPP land pre-pit

BEST MODE FOR CARRYING OUT THE INVENTION

Hereinafter, the best mode for carrying out the present invention will be discussed in order for each embodiment, with reference to the drawings.

Hereinafter, the embodiments of the present invention will be explained on the basis of the drawings.

(Information Recording Medium)

Firstly, with reference to FIG. 1 to FIG. 6, an embodiment of the information recording medium of the present invention will be explained.

(1) Basic Structure

Firstly, with reference to FIG. 1 to FIG. 3, the basic structure of an optical disc in the embodiment of the information recording medium of the present invention will be explained. FIG. 1(a) is a substantial plan view showing the basic structure of the optical disc having a plurality of recording areas in the embodiment of the information recording medium of the present invention, and FIG. 1(b) is a schematic cross sectional view of the optical disc and a corresponding conceptual diagram showing a recording area structure in the radial direction. FIG. 2 is a partially enlarged perspective view showing the recording surface of the optical disc in the embodiment.

FIG. 3 is an explanatory diagram showing a reproduction signal in reproducing wobble and LPP formed on the optical disc in the embodiment.

As shown in FIG. 1(a) and FIG. 1(b), an optical disc 100 has a recording surface on a disc main body with a diameter of about 12 cm, as is a DVD. On the recording surface, the optical disc 100 is provided with: a center hole 101 as the center; a lead-in area 102 or a lead-out area 108; a data recording area 105; and a lead-out area 108 or a middle area 109. Then, a track or tracks, such as groove tracks and land tracks, are alternately placed, spirally or concentrically, centered on the center hole 101. On the track, data is divided and recorded by a unit of ECC block. The ECC block is an error-correctable data management unit.

Incidentally, the present invention is not particularly limited to the optical disc having these three areas. For example, even if the lead-in area 102, the lead-out area 108 or the middle area 109 does not exist, a data structure explained below can be constructed. Moreover, as described later, the lead-in area 102, the lead-out area 108 or the middle area 109 may be further segmentalized.

Particularly, the optical disc 100 in the embodiment, as shown in FIG. 1(b), has such a structure that the L0 layer and the L1 layer, which constitute one example of the "first and second record layers" of the present invention as descried later, respectively, are laminated on a transparent substrate 110, for example. Upon the recording/reproduction of such a dual-layer type optical disc 100, the recording/reproduction in the L0 layer or the L1 layer is performed, depending on which recording layer has the focus position of laser light LB, irradiated from the upper to the lower side in FIG. 1(b).

As shown in FIG. 2, the optical disc 100 in the embodiment is constructed as a dual-layer type optical disc on which a plurality of data recording areas 105 or the like are formed in a lamination structure, for example. FIG. 2 is a partially enlarged perspective view showing the recording surface of the optical disc in the first embodiment.

In FIG. 2, in the embodiment, on the optical disc 100, a first recording layer 117 (i.e. L0 layer) of an irreversible change recording type by heat or the like constituting the information recording surface is laminated on (on the lower side of, in FIG. 2) the disc-shaped transparent substrate 110, and moreover, a semitransparent reflective film 118 is laminated thereon (on the lower side thereof in FIG. 2). Moreover, a second recording layer 127 (i.e. L1 layer) is laminated on the first recording layer 117. Specifically, an adhesive layer 115 is formed on the semitransparent reflective film 118, and the second recording layer 127 is laminated on the adhesive layer 115, and a reflective film 128 is laminated on the second recording layer 127, and lastly, a substrate layer 125 is laminated thereon. On the information recording surface, constructed from the surfaces of the first recording layer 117 and the second recording layer 127, there are alternately formed a groove track GT and a land track LT. Incidentally, at the time of recording and reproduction of the optical disc 100, as shown in FIG. 2, for example, the laser light LB is irradiated onto the groove track GT through the transparent substrate 110. For example, at the time of recording, the laser light LB is irradiated with a recording laser power, by which the irreversible change recording by hear or the like is performed in the first recording layer 117 and the second recording layer 127 in accordance with the record data. On the other hand, at the time of reproduction, the laser light LB is irradiated with a reproduction laser power, which is weaker than the recording laser power, by which the data recorded in the first recording layer 117 and the second recording layer 127 is read.

Then, the groove track GT wobbles with a constant amplitude and at a constant spatial frequency. Namely, the groove track GT wobbles, and the cycle of the wobble 119 is set to a predetermined value. On the land track LT, an address pit referred to as a land pre-pit LPP is formed, which indicates a pre-format address. The two addressing (i.e. the wobble 119 and the land pre-pit LPP) can give the information necessary for the data recording, such as a recording address, the generation of a recording clock, and the control of disc rotation during the recording. Incidentally, the information necessary for the data recording, such as the pre-format address, may be recorded in advance, by modulating the wobble 119 of the groove track GT in a predetermined modulation method, such as frequency modulation and phase modulation.

If the wobble 119 and the land pre-pit LPP are reproduced, a reproduction signal shown in FIG. 3 is obtained. As shown in FIG. 3, in the reproduction signal obtained by reproducing the wobble 119 and the land pre-pit LPP, a reproduction signal corresponding to the land pre-pit LPP is superimposed on a reproduction signal corresponding to the cycle of the wobble 119 (e.g. a sign wave) near the peak of the sign wave. By processing a process of demodulation or the like on the reproduction signal, it is possible to obtain the pre-format address (e.g. ECC block address, described later) and the recording clock. It is also possible to obtain various information described later (e.g. layer information 200, described later).

Incidentally, in the case of a DVD-R/RW as one specific example of the optical disc 100, there are eight wobbles 119 per one sync frame, and the land pre-pit LPP is formed in the first three wobbles 119 out of the eight wobbles 119 in accordance with the information to be recorded.

(2) Data Structure

Next, with reference to FIG. 4 to FIG. 6, the specific data of the information recording medium in the embodiment will be explained. FIG. 4 are explanatory diagrams showing the data structure and the data content of pre-pit data recorded on the optical disc in the embodiment. FIG. 5 is an explanatory diagram showing the more detailed data structure of the pre-pit data recorded on the optical disc in the embodiment. FIG. 6 is an explanatory diagram showing the more detailed data structure and data content of layer information included in the pre-pit data in the embodiment.

As shown in FIG. 4(*a*), the pre-pit data is recorded by the land pre-pit LPP, and one pre-pit data is provided with two data group units distinguished by using terms of a part A and a part B. In the embodiment, the pre-pit data expressed by the two data group units of the part A and the part B is distinguished by using an identification number referred to as a field ID. For example, in the embodiment, the pre-pit data is distinguished by using a series of field ID from "ID_0" to "ID_5". For example, one pre-pit data (i.e. the pre-pit data including one data group of the part A and one data group of the part B) is recorded by the land pre-pit LPP formed on the wobble 119 of several tens cycles. However, it is obvious that the number of field IDs may be increased or reduced in necessary.

In the data group of the part A, information regarding an ECC block address or the like of a position in which the pre-pit data is recorded. Moreover, in the data group of the part B, various different information is recorded, depending on the field ID of the pre-pit data including the relevant data group.

More specifically explaining it, in the data group of the part B, six different types of information is recorded, depending on the six field IDs of "ID_0" to "ID_5".

For example, in the data group of the part B of the pre-pit data with the field ID expressed by "ID_1", an application code which is to identify application using the optical disc 100 is recorded. Moreover, in the data group of the part B of the pre-pit data with the field ID expressed by "ID_3", a manufacturer code which is to identify the manufacturer of the optical disc 100 is recorded. Particularly, here, a first manufacturer code which indicates one portion of the manufacturer code is recorded. Moreover, in the data group of the part B of the pre-pit data with the field ID expressed by "ID_4", a second manufacturer code which indicates another portion of the manufacturer code is recorded. Moreover, the data group of the part B of the pre-pit data with the field ID expressed by "ID_2" and "ID_5" is a free space and reserved as a reserved area for future function expansion.

Then, the pre-pit data with the field ID expressed by "ID_1" to "ID_5" described here is recorded mainly in any of the lead-in area 102, the lead-out area 108, and the middle area 109, or in these plurality of areas. Namely, the pre-pit data with the field ID expressed by "ID_1" to "ID_5" is recorded by using the land pre-pit LPP formed in the lead-in area 102 and the like, and the pre-pit data with the field ID expressed by "ID_1" to "ID_5" is not recorded by the land-pre pit LPP formed in the data recording area 105. However, obviously, it may be constructed such that that the pre-pit data with the field ID expressed by "ID_1" to "ID_5" is recorded by the land pre-pit LPP formed in the data recording area 105.

Particularly in the embodiment, in the data group of the part B of the pre-pit data with the field ID expressed by "ID_0", the ECC block address and layer information 200 corresponding to one specific example of the "property information" of the present invention are recorded. The pre-pit data with the field ID expressed by "ID_0" is recorded over the all areas (i.e. the above-mentioned lead-in area 102, data recording area 105, lead-out area 108, and middle area 109, etc.) of the optical disc 100. Namely, the pre-pit data with the field ID expressed by "ID_0" is recorded by the land pre-pit LPP formed over the all areas of the optical disc 100.

Here, the more detailed data structure of the pre-pit data with the field ID expressed by "ID_0" will be explained, with reference to FIG. 5. As shown in FIG. 5, the pre-pit data with the field ID expressed by "ID_0" is divided into areas of a 0 frame to a 15th frame, and various information is recorded therein. Each frame has a size of 13 bits. Then, the information from the 0 frame to a 5th frame corresponds to the above-mentioned data group of the part A, and the information from a 6 frame to the 15th frame corresponds to the above-mentioned data group of the part B.

The head bit (0 bit) of each frame is a sync bit and is used to take synchronization for identifying the pre-pit data. Moreover, the following 4 bits (1st bit to 4th bit) are bits for identifying each frame, and a bit row peculiar to each frame is recorded.

Then, in the following 8 bits (5th bit to 12th bit), information peculiar to each frame is recorded. For example, in the 0 frame to the 2nd frame, the ECC block address is divided and recorded. Moreover, in the 7th frame to the 9th frame, the same ECC block address is divided and recorded. Moreover, in the 6th frame, the field ID of the pre-pit data is recorded, for example.

Incidentally, even the pre-pit data with the field ID expressed by "ID_1" to "ID_5" has the same data structure as that shown in FIG. 5. For example, in the 6th frame to the 15th frame, the application code and the first or second manufacturer code or the like, described above, are recorded.

Particularly in the embodiment, the layer information 200 is recorded in the 5th bit to the 12th bit of the 10th frame. The layer information 200 includes information indicating the various conditions, properties, types, statuses, characteristics, attribute or the like of the optical disc 100. The more detailed data structure of the layer information 200 will be explained, with reference to FIG. 6.

As shown in FIG. 6, the layer information 200 includes a layer flag 210 in the 5th bit of the 10th frame. Moreover, the 6th bit to the 12th bit are reserved as the reserved area for future function expansion. The layer flag 210 indicates whether the recording layer in which the layer information 200 including the layer flag 210 is recorded, is the L0 layer or the L1 layer. Alternatively, the layer flag 210 may indicate whether to be such an optical disc that has a single recording layer in which the layer information 200 including the layer flag 210 is recorded, is a single layer, or such an optical disc that has a plurality of recording layers in which the layer information 200 including the layer flag 210 is recorded.

For example, if the layer flag 210 indicates "0b", it indicates that the layer information 200 including the layer flag 210 is recorded in the L0 layer. In other words, it indicates that the recording layer in which the data is currently recorded (i.e. the recording layer on which the laser light LB is focused) is the L0 layer. On the other hand, if the layer flag 210 indicates "1b", it indicates that the layer information 200 including the layer flag 210 is recorded in the L1 layer. In other words, it indicates that the recording layer in which the data is currently recorded (i.e. the recording layer on which the laser light LB is focused) is the L1 layer.

Namely, in the case of the dual-layer type optical disc 100 as in the embodiment, the layer flag 210 indicated by "0b" is recorded in the land pre-pit LPP in the L0 layer, and the layer flag 210 indicated by "1b" is recorded in the land pre-pit LPP in the L1 layer.

Therefore, during the recording operation of an information recording/reproducing apparatus described later, it is possible to judge whether the recording layer in which the data is currently recorded is the L0 layer or the L1 layer, relatively easily. Then, the layer flag 210 (or the layer information 210) is recorded on the optical disc 100 with it included in the pre-pit data with the field ID expressed by "ID_0", so that the layer flag 210 is recorded throughout the entire optical disc 100. Namely, it is unnecessary to bother to access the lead-in area 102 or the like in order to read the layer flag 210. Thus, it is possible to read and obtain the layer flag 210, quickly (or immediately or instantly), in parallel with the recording operation. Therefore, even if the laser light LB is focused on the recording layer different from the recording layer in which the recording is originally to be performed, it is possible to recognize the incorrect focusing, relatively easily and quickly (or immediately or instantly). Thus, it is possible to effectively prevent or inhibit the incorrect recording in the different recording layer. Namely, it is possible to preferably record the data into the desired recording layer from among the plurality of recording layers.

For example, even if focus jump to the L1 layer is mistakenly performed when the data is recorded into the L0 layer, it is possible to read and obtain the layer flag 210 from the land pre-pit LPP in the incorrect focus jump destination, quickly (or immediately or instantly). By this, it is possible to recognize the incorrect focus jump to the L1 layer, quickly (or immediately or instantly), to thereby effectively prevent or inhibit the incorrect recording into the L1 layer. Moreover, even if the incorrect recording is slightly performed in the L1 layer, the layer flag 210 is read and obtained, quickly (or immediately or instantly), so that it is possible to stop the incorrect recording only in one to two ECC blocks.

As explained above, the layer information 200 is recorded on the optical disc 100 in the embodiment, so that it is possible to judge whether the recording layer in which the data is currently recorded is the L0 layer or the L1 layer, relatively easily and quickly (or immediately or instantly), at the time of the recording operation of the information recording/reproducing apparatus described later, for example. Then, on the basis of the judgment about the recording layer, it is possible to realize the preferable recording operation, relatively easily.

Incidentally, in addition to the above-mentioned various information, a flag or the like indicating the properties and conditions or the like of each recording layer may be recorded.

Moreover, in the above-mentioned embodiment, the pre-pit data including the layer information 200 (i.e. the pre-pit data in which the field ID is expressed by "ID_0") is recorded throughout the entire optical disc 100, but it is not limited to this. For example, the pre-pit data including the layer information 200 may be recorded only into the data recording area 105. Alternatively, the pre-pit data including the layer information 200 may be recorded into one portion of the data recording area 105. In this case, the pre-pit data including the layer information 200 may be recorded in the data recording area 105, uniformly (e.g. on the relatively inner circumferential side and on the relatively outer circumferential side). By virtue of such construction, even if the pre-pit data including the layer information 200 is not recorded on the entire surface of the optical disc 100, it is possible to receive the above-mentioned various benefits, properly. Alternatively, the pre-pit data including the layer information may be recorded only into at least one of the lead-in area 102, the lead-out area 108, and the middle area 109.

Moreover, in the embodiment, the optical disc of DVD-R/RW or the like, provided with the land pre-pit LPP, is explained as one specific example with regard to the optical disc 100; however, it is not necessarily limited to this. For example, even in the case of an optical disc of DVD+R/RW, the same layer information 200 may be recorded by BPM (Bi Phase Modulation) performed on the wobble 119. Alternatively, even in other various information recording media, it is obvious that the layer information 200 may be recorded into the entire surface or at least one portion of the recording surface.

(3) Modified Example

Next, with reference to FIG. 7, a modified example of the information recording medium in the embodiment will be explained. FIG. 7 is an explanatory diagram showing the more detailed data structure of the layer information included in the pre-pit data in the modified example.

In the optical disc in the modified example, as in the above-mentioned optical disc 100, layer information 200a is recorded in the 10th frame of the pre-pit data with the field ID expressed by "ID_".

Particularly in the modified example, the layer information 200a includes a media flag 220, a layer number flag 230, a track direction flag 240, and an address direction flag 250, as shown in FIG. 7, in addition to the above-mentioned layer flag 210.

The media flag 220 is recorded in the 6th bit of the 10th frame of the pre-pit data, and indicates a type of recording area (or media) the recording area in which the flag information 200a including the media flag 220 is recorded, is. For example, if the media flag 220 indicates "0b", it indicates that the recording area is a recordable type recording area. Moreover, if the media flag 220 indicates "1b", it indicates that the recording area is not a recordable type recording area. Alternatively, by segmentizing the media flag 220, it may include the media flag 220 indicating a read-only type recording area, or the media flag 220 indicating an additional recording type (i.e. write-once type) recording area, or the media flag 220 indicating a rewritable type (i.e. re-recordable type) recording area.

Then, the layer information 200a is recorded throughout the entire surface of the optical disc 100, as in the above-mentioned layer flag 210. Thus, in the case of a hybrid type optical disc on which the read-only type recording area and the recordable type recording area are mixed in one recording layer, for example, if the land pre-pit LPP formed in the read-only type recording area is reproduced, it is possible to obtain the media flag 220 indicating that the recording area is the read-only type, whereas if the land pre-pit LPP formed in the recordable type recording area is reproduced, it is possible to obtain the media flag 220 indicating that the recording area is the recordable type. Therefore, it is possible to recognize the difference (or the boundary) between the recording areas, from the land pre-pit LPP formed throughout the entire surface of the optical disc 100, relatively easily and quickly (or immediately or instantly). Thus, it is possible to change a recording strategy and a power in the recording operation, quickly (or immediately or instantly), in accordance with the different in the recording area, which enables the realization of the more preferable recording operation. Of course, it is obvious that regardless of the hybrid type optical disc, it is possible to realize the preferable recording operation as described above, by referring to the media flag 220.

The layer number flag 230 is recorded in the 7th and 8th bits of the 10th frame of the pre-pit data, and as in the above-mentioned layer flag 210, it indicates whether the recording layer in which the layer information 200a including the layer flag 210 is recorded, is the L0 layer or the L1 layer. In particular, the layer number flag 230 is constructed in the optical disc having three or more recording layers so as to identify each of the recording layers.

For example, if the layer number flag 230 indicates "00b", it may indicate that the recording layer in which the layer information 200a including the layer number flag 230 is recorded is the L0 layer. Moreover, for example, if the layer number flag 230 indicates "01b", it may indicate that the recording layer in which the layer information 200a including the layer number flag 230 is recorded is the L1 layer. For example, if the layer number flag 230 indicates "10b", it may indicate that the recording layer in which the layer information 200a including the layer number flag 230 is recorded is a L2 layer (i.e. a third recording layer). For example, if the layer number flag 230 indicates "11b", it may indicate that the recording layer in which the layer information 200a including the layer number flag 230 is recorded is a L3 layer (i.e. a fourth recording layer). Moreover, if the number of bits allocated to the layer number flag 230 is increased, it is possible to identify a larger number of recording layers.

Then, by referring to the layer number flag 230, it is possible to receive the same various benefits as those in referring to the above-mentioned layer flag 210.

The track direction flag 240 is recorded in the 10th bit of the 10th frame of the pre-pit data, and it indicates a traveling direction of the track (the above-mentioned groove track GT and land track LT, etc.) in the recording area (or moreover its vicinity) in which the flag information 200a including the track direction flag 240 is recorded. For example, if the track direction flag 240 indicates "0b", it may indicate that the track in the recording layer in which the layer information 200a including the track direction flag 240 is recorded travels from the inner circumferential side to the outer circumferential side. For example, if the track direction flag 240 indicates "1b", it may indicate that the track in the recording layer in which the layer information 200a including the track direction flag 240 is recorded travels from the outer circumferential side to the inner circumferential side.

For example, in the case of the optical disc of a parallel track path type in which the track traveling directions of the L0 layer and the L1 layer are equal to each other, the track direction flags 240 obtained by the land pre-pit LPP in the L0 layer and the L1 layer both have the same value. Alternatively, in the case of the optical disc of an opposite track path type in which the track traveling directions of the L0 layer and the L1 layer are opposite to each other, the track direction flags 240 obtained by the land pre-pit LPP in the L0 layer and the L1 layer have different values.

In particular, in the case of such an optical disc that the track direction changes in one recording layer, it is possible to recognize the track direction and the boundary portion in which the track direction changes, relatively easily and immediately or instantly, by referring to the track direction flag 240. Therefore, in accordance with the change in the track direction, it is possible to recognize a track jump direction and a displacement direction of a slider for displacing an optical pickup, or the like, for example, relatively easily and quickly (or immediately or instantly). As a result, it is possible to perform the more preferable recording operation. Of course, it is obvious that regardless of the optical disc that the track direction changes in one recording layer, it is possible to realize the preferable recording operation as described above, by referring to the track direction flag 240.

The addressing flag 250 is recorded in the 12th bits of the 10th frame of the pre-pit data, and it indicates the aspect of addressing in the ECC block address (i.e. the recording aspect of the ECC block address) of the recording area (or moreover its vicinity) in which the flag information 200a including the addressing flag 250 is recorded. For example, if the addressing flag 250 indicates "0b", it may indicate that the aspect of the addressing in the recording layer in which the layer information 200a including the addressing flag 250 is recorded is a decrement type. Incidentally, the decrement type addressing indicates such an addressing aspect that the value of the ECC block address recorded in the land pre-pit LPP decreases monotonously from the inner circumferential side to the outer circumferential side of the optical disc 100, for example. Moreover, for example, if the addressing flag 250 indicates "1b", it may indicate that the aspect of the addressing in the recording layer in which the layer information 200a including the addressing flag 250 is recorded is of an increment type. Incidentally, the increment type addressing indicates such an addressing aspect that the value of the ECC block address recorded in the land pre-pit LPP increases monotonously from the inner circumferential side to the outer circumferential side of the optical disc 100, for example.

Alternatively, for example, if the addressing flag 250 indicates "0b", it may indicate that the aspect of the addressing in the recording layer in which the layer information 200a including the addressing flag 250 is recorded is a bit-inverted type. Incidentally, the bit-inverted type addressing indicates such an addressing aspect that the value of a physical sector number indicating the address of the data to be recorded on the optical disc 100 and the value of the ECC block address recorded in the land pre-pit LPP have a bit-inverted relationship. Moreover, for example, if the addressing flag 250 indicates "1b", it may indicate that the aspect of the addressing in the recording layer in which the layer information 200a including the addressing flag 250 is recorded is a bit-non-inverted type. Incidentally, the bit-non-inverted type addressing indicates such an addressing aspect that the value of the physical sector number indicating the address of the data to be recorded on the optical disc 100 and the value of the ECC block address recorded in the land pre-pit LPP do not have the bit-inverted relationship.

In particular, in the case of such an optical disc that the aspect of the addressing changes in one recording layer, it is possible to recognize the addressing aspect and the boundary portion in which the addressing aspect changes, relatively easily and quickly (or immediately or instantly), by referring to the addressing flag 250. Therefore, in accordance with the change in the addressing aspect, it is possible to recognize the track jump direction and the displacement direction of the slider for displacing the optical pickup, or the like, for example, relatively easily and quickly (or immediately or instantly). As a result, it is possible to perform the more preferable recording operation. Of course, it is obvious that regardless of the optical disc that the addressing aspect changes in one recording layer, it is possible to realize the preferable recording operation as described above, by referring to the addressing flag 250.

Incidentally, the bit position, the size, and the frame number or the like of the layer information 200 (or the various information, such as the layer flag 210, included therein), in the embodiment and the modified example described above are merely one example, and obviously, they are not limited to the range of the explanation described above. For example, if there is a space area as the pre-pit data in terms of the standard of the existing optical disc, it is obvious that the above-mentioned layer information 200 or the like may be recorded into the space area.

Moreover, in the embodiment and the modified example described above, the optical disc 100 having the two recording layers is explained as a specific example; however, of course, the optical disc having three or more recording layers may also adopt the same structure. Moreover, the optical disc having a single recording layer may also adopt the same structure.

(Information Recording/Reproducing Apparatus)

Next, with refer to FIG. 8 to FIG. 11, an information recording/reproducing apparatus will be explained, which is an embodiment of the information recording apparatus of the present invention.

(1) Basic Structure

Firstly, with reference to FIG. 8, the structures of an information recording/reproducing apparatus 300 in the embodiment and a host computer 400 will be explained. FIG. 8 is a block diagram showing the information recording/reproducing apparatus 300 in the embodiment and the host computer 400. Incidentally, the information recording/reproducing apparatus 300 has a function of recording the record data onto the optical disc 100 and a function of reproducing the record data recorded on the optical disc 100.

Firstly, with reference to FIG. 2, the inner structure of the information recording/reproducing apparatus 300 will be discussed. The information recording/reproducing apparatus 300 is an apparatus for recording the information onto the optical disc 100 and reading the information recorded on the optical disc 100, under the control of CPU (Central Processing Unit) 354 for drive.

The information recording/reproducing apparatus 300 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 is provided with a semiconductor laser device, a lens, and the like, for example, in order to perform the recording/reproduction with respect to the optical disc 100. More specifically, the optical pickup 352 irradiates the optical disc 100 with laser light, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser device located in the optical pickup 352. The head amplifier amplifies the output signal of the optical pickup 352, i.e. the reflective light of the laser light, and outputs the amplified signal. More specifically, the signal recording/reproducing device 353 drives the not-illustrated semiconductor laser device located in the optical pickup 352, in order to determine an optimum laser power by the recording and reproduction processes for an OPC pattern, together with a not-illustrated timing generator or the like, under the CPU 354, upon an OPC (Optimum Power Control) process.

The memory 355 is used in the general data processing and the OPC process or the like on the information recording/reproducing apparatus 300 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer for temporary storage of the record/reproduction data; a RAM area into which a parameter required for the operation of the firmware program or the like is stored; and the like.

The CPU (drive control device) 354 is connected to the signal recording/reproducing device 353 and the memory 355 through the bus 357, and controls the entire disc drive 300 by giving an instruction to various controlling devices. Normally, software or firmware for operating the CPU 354 is stored in the memory 355.

The data input/output control device 306 is constructed to control the data input/output from the exterior to the information recording/reproducing apparatus 300, and perform storage/export with respect to the data buffer on the memory 355. A drive control command issued from the exterior host computer 400 (hereinafter referred to as a "host", as occasion demands), which is connected through an interface, such as SCSI and ATAPI, to the information recording/reproducing apparatus 300, is transmitted to the CPU 354 through the data input/output control device 306. Moreover, the record/reproduction data is also exchanged with the host computer 400 through the data input/output control device 306 as well.

The operation/display control device 307 receives an operation instruction and performs display with respect to the host computer 400, and transmits an instruction by the operation button 310, such as an instruction to record or reproduce, to the CPU 359. The CPU 359 transmits a control command to the information recording/reproducing apparatus 300, through the data input/output control device 308, on the basis of instruction information from the operation/display control device 307, to thereby control the entire information recording/reproducing apparatus 300. In the same manner, the CPU 359 can transmit a command for requesting the information recording/reproducing apparatus 300 to transmit an operational state to the host, with respect to the information recording/reproducing apparatus 300. By this, the operational state of the information recording/reproducing apparatus 300, such as during recording and during reproduction, can be recognized, so that the CPU 359 can output the operational state of the information recording/reproducing apparatus 300 to the display panel 3110, such as a fluorescent tube and an LCD, through the operation/display control device 307.

The memory 360 is an inner storage apparatus used by the host computer 400, and is provided with: a ROM area into which a firmware program, such as a BIOS (Basic Input/Output System), is stored; a RAM area into which a parameter required for the operation of an operating system and an application program and the like are stored; and the like. Moreover, the memory 360 may be connected to a not-illustrated external storage apparatus, such as a hard disk, through the data input/output control device 308.

One specific example used by combining the information recording/reproducing apparatus 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing the program stored in the memory 360, on the CPU 359. Moreover, in another specific example, the information recording/reproducing apparatus 300 is a disc drive (hereinafter referred to as a "drive", as occasion demands), and the host computer 400 is a personal computer and a work station. The host computer 400, such as the personal computer, and the disc drive are connected through the data input/output control devices 306 and 308, such as the SCSI and the ATAPI, and application, such as writing software, installed in the host computer 400 controls the disc drive.

(2) Recording Operation Example

Next, with reference to FIG. 9 to FIG. 11, the recording operation performed by the information recording/reproducing apparatus 300 in the embodiment will be explained. FIG. 9 is a flowchart conceptually showing a flow of the entire recording operation. FIG. 10 is a flowchart conceptually showing a flow of a layer jump operation. FIG. 11 is a flowchart conceptually showing a flow of a recording stop operation.

As shown in FIG. 9, under the control of the CPU 354, firstly, the optical pickup 352 is displaced to a position before the recording area in which the data recording is started, and the recording area in the nearest position is searched (step S101). Then, the recording area in the before position is irradiated with the laser light LB with the first power as the reading light, to thereby reproduce the land pre-pit LPP (step S102). Then, the layer information 200 (particularly, the layer flag 210) included in the pre-pit data obtained by the reproduced land pre-pit LPP is obtained (step S103).

After that, under the control of the CPU 354, on the basis of the layer flag 210, it is judged whether or not the recording layer on which the laser light LB is currently focused is the target recording layer in which the data is about to be recorded from now (step S104).

As a result of this judgment, if it is judged not to be the target recording layer (the step S104: No), a layer jump operation is performed so as to focus the laser light LB on the target recording layer (step S110). This layer jump operation will be described in detail later (refer to FIG. 10).

On the other hand, if it is judged to be the target recording layer (the step S104: Yes), then, under the control of the CPU 354, it is judged whether or not the laser light LB can be irradiated onto the recording layer in which the data recording is to be started (step S105). Namely, it is judged whether or not the optical pickup 352 is displaced in the recording layer in which the data recording is to be started.

As a result of this judgment, if it is judged that the laser light cannot be irradiated (the step S105: No), the optical pickup 352 or the like is displaced to a predetermined position so as to irradiate the laser light LB onto the recording layer in which the data recording is to be started (step S109).

On the other hand, if it is judged that the laser light can be irradiated (the step S105: Yes), the recording operation is started, and the data is recorded into the data recording area 105 or the like (step S106). Namely, the laser light LB with the second power as the writing light is irradiated, to thereby record the data.

In this recording operation, the layer flag 210 or the like is referred to in real time or in predetermined timing, and under the control of the CPU 354, it is judged whether or not the recording layer on which the laser light LB is currently focused is the target (or correct) recording layer in which the data is to be recorded (step S107).

As a result of this judgment, if it is judged not to be the target recording layer (the step S107: No), a recording stop operation is performed (step S111). Incidentally, the recording stop operation will be described in detail later (refer to FIG. 11).

On the other hand, if it is judged to be the target recording layer (the step S107: Yes), then, under the control of the CPU 354, it is judged whether or not the recording operation is ended (step S108). For example, it may be judged that the recording operation is ended if all the data to be recorded is recorded or if an instruction to stop the recording is given by a user.

As a result of this judgment, if it is judged that the recording operation is not ended (the step S108: No), the operational flow returns to the step S106 again to continue the recording operation. On the other hand, if it is judged that the recording operation is ended (the step S108: Yes), the recording operation is ended. If necessary, a process of finalizing the optical disc 100 may be performed, or the optical disc 100 may be ejected from the information recording/reproducing apparatus 300.

Next, the layer jump operation will be explained with reference to FIG. 10. As shown in FIG. 10, under the control of the CPU 354, various parameters for performing the focus jump to the target recording layer are set (step S201). For example, an optimum control voltage is set, as occasion demands, to perform the focus jump to the target recording layer from the recording layer on which the laser light LB is currently focused. Then, under the control of the CPU 354, the focus jump to the target recording layer is performed (step S203). Namely, the laser light LB is focused on the target recording layer. Specifically, the laser light LB is focused by displacing the optical pickup 352 (or the objective lens included in the optical pickup 352) closer to or farther from the recording surface of the optical disc 100, for example.

After that, the land pre-pit LPP in the focus jump destination is reproduced, to thereby obtain the layer flag 210 (step S103). Then, under the control of the CPU 354, on the basis of the layer flag 210, it is judged whether or not the recording layer on which the laser light LB is currently focused is the target recording layer in which the data is about to be recorded from now (the step S104).

As a result of this judgment, if it is judged not to be the target recording layer (the step S104: No), the layer jump operation is not normally performed, so that the above-mentioned step S201 and step S202 are performed again, and the focus jump to the target recording layer is performed.

On the other hand, if it is judged to be the target recording layer (the step S104: Yes), the layer jump operation is normally performed, so that the layer jump operation is ended to thereby return to the data recording operation again.

Next, the recording stop operation will be explained with reference to FIG. 11. As shown in FIG. 11, the data recording is stopped by reducing the power of the irradiating laser light LB to the first power or less as the reading light or zero, for example (step S301).

After that, as in the above-mentioned layer jump operation, the focus jump to the target recording layer is performed, and it is judged whether or not the recording layer which is the destination of the focus jump is the target recording layer (the steps S201, S202, S103, and S104).

As a result of this judgment, if it is judged not to be the target recording layer (the step S104: No), the layer jump operation is not normally performed, so that the above-mentioned step S201 and step S202 are performed again, and the focus jump to the target recording layer is performed.

On the other hand, if it is judged to be the target recording layer (the step S104: Yes), the layer jump operation is normally performed. Thus, then, under the control of the CPU 354, the last recording area in which the data is correctly recorded is searched for, to thereby obtain the ECC block address of the last recording area (step S302). For example, if the focusing on the L1 layer is mistakenly performed while the data is recorded into the L0 layer, the ECC block address of the recording area in the L0 layer in which the data is recorded immediately before the incorrect focusing is obtained.

After that, under the control of the CPU 354, the data to be recorded from the position of the ECC block address obtained in the step S302 is extracted or generated (step S303). After that, the recording operation is restarted, and the data to be recorded is recorded from the recording area of the ECC block address obtained in the step S302.

As described above, the information recording/reproducing apparatus 300 in the embodiment can judge whether the recording layer in which the data is currently recorded is the L0 layer or the L1 layer, relatively easily and quickly (or immediately or instantly), by referring to the layer information 200. Then, on the basis of the judgment about the recording layer, for example, if the focus jump or the like is mistakenly performed, it is possible to recognize the incorrect focus jump or the like, quickly (or immediately or instantly), to thereby perform the focusing again onto the original recording layer. As a result, it is possible to realize the preferable recording operation, relatively easily.

Moreover, in the above-mentioned embodiment, the optical disc 100 is explained as one example of the information recording medium, and the recorder related to the optical disc 100 is explained as one example of the information recording apparatus. The present invention, however, is not limited to the optical disc and the recorder thereof, and can be applied to other various recording media which support high density recording or high transfer rate and the recorders thereof.

The present invention is not limited to the above-described embodiment, and various changes may be made, if desired, without departing from the essence or spirit of the invention which can be read from the claims and the entire specification. An information recording apparatus, a information recording apparatus, an information recording method, and a computer program for recording control, which involve such changes, are also intended to be within the technical scope of the present invention.

INDUSTRIAL APPLICABILITY

The information recording apparatus, the information recording apparatus, and the computer program according to the present invention can be applied to a high-density optical disc, such as a DVD, for example, and also applied to an information recording apparatus, such as a DVD recorder. Moreover, they can be applied to an information recording apparatus or the like, which is mounted on or can be connected to various computer equipment for consumer use or business use, for example.

The invention claimed is:
1. An information recording medium, comprising:
   a plurality of recording layers to record therein record information,
   pre-pit data including a plurality of frames being recorded in each of the plurality of recording layers, each of the frames comprising: a sync bit for taking synchronization in identifying the pre-pit data; an identification bit row for identifying each of the frames; and a peculiar information bit row which is information peculiar to each of the frames, in this order, and
   in one of the frames, a layer identification flag for identifying the each recording layer being recorded in a head bit of the peculiar information bit row, wherein,
   the pre-pit data comprises two data groups,
   a first data group of the two data groups includes: an ECC block address of a position in which the pre-pit data is recorded; and a parity, in this order,
   a second data group of the two data groups includes: the ECC block address, the peculiar information bit row including the layer identification flag; and the parity, in this order,
   the second data group has a field ID for identifying the pre-pit data at a head of the second data group, and
   a space area is reserved as a reserved area between the peculiar information bit row and the parity, in the second data group.
2. The information recording medium according to claim 1, wherein the first data group includes 6 frames, and the second data group includes 10 frames.
3. The information recording medium according to claim 1, wherein a size of the sync bit is 1 bit, a size of the identification bit row is 4 bits, a size of the peculiar information bit row is 8 bits, and a size of the layer identification flag is 1 bit.
4. The information recording medium according to claim 1, wherein
   each of the plurality of recording layers comprises a data recording area to record therein the record information, and
   the pre-pit data is recorded to be distributed in the entire data recording area in the each recording layer.

5. The information recording medium according to claim 1, wherein the pre-pit data is recorded to be distributed in the entire each recording layer.

6. The information recording medium according to claim 1, wherein the pre-pit data includes a type flag indicating a type of recording in the each recording layer.

7. The information recording medium according to claim 1, wherein the pre-pit data includes a track direction flag indicating a record track traveling direction in the each recording layer.

8. The information recording medium according to claim 1, wherein the pre-pit data includes an address flag indicating a recording aspect of address information in the each recording layer.

9. An information recording apparatus comprising:
- an obtaining device for obtaining a layer identification flag from an information recording medium comprising a plurality of recording layers to record therein record information, pre-pit data including a plurality of frames being recorded in each of the plurality of recording layers, each of the frames comprising: a sync bit for taking synchronization in identifying the pre-pit data; an identification bit row for identifying each of the frames; and a peculiar information bit row which is information peculiar to each of the frames, in this order, and in one of the frames, the layer identification flag for identifying the each recording layer being recorded in a head bit of the peculiar information bit row; and
- a recording device for recording the record information on the basis of the obtained layer identification flag, wherein, the pre-pit data comprises two data groups, a first data group of the two data groups includes: an ECC block address of a position in which the pre-pit data is recorded; and a parity, in this order, a second data group of the two data groups includes: the ECC block address, the peculiar information bit row including the layer identification flag; and the parity, in this order, the second data group has a field ID for identifying the pre-pit data at a head of the second data group, and a space area is reserved as a reserved area between the peculiar information bit row and the parity, in the second data group.

* * * * *